Figure 1A:
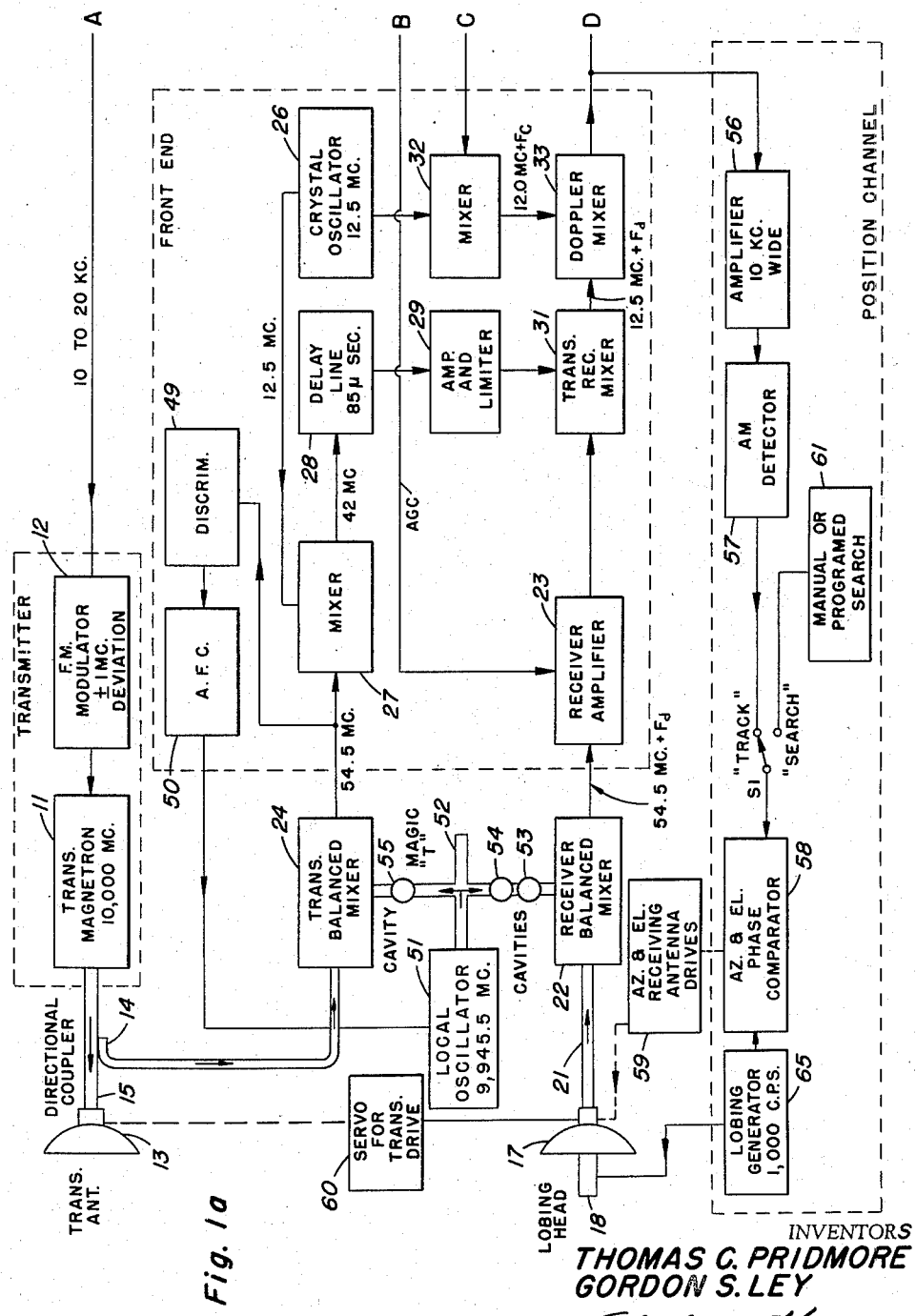

INVENTORS
THOMAS C. PRIDMORE
GORDON S. LEY

United States Patent Office 2,860,331
Patented Nov. 11, 1958

2,860,331

OSCILLOSCOPE DISPLAY METHOD AND CIRCUIT FOR F. M. RADAR SYSTEMS

Thomas C. Pridmore, Bath, N. Y., and Gordon S. Ley, Plainfield, N. J., assignors, by mesne assignments, to the United States of America as represented by the Secretary of the Navy Application December 15, 1955, Serial No. 553,397

9 Claims. (Cl. 343—9)

The present invention relates to an oscilloscope display method and circuit for FM radar systems.

An object such as an aircraft has four quantities of interest (azimuth, elevation, range, and velocity) which are detectable by radar systems. Up to the time of the present invention, radar systems have been capable of detecting and displaying, at most, only three of these, but it is of course desirable, in many situations, to have knowledge of all four quantities. The present invention pertains to a circuit that can be utilized to replace the search and display circuits of existing FM radar systems and which will display all four quantities when the radar system, in which the circuit is connected, is in a search condition. Two mutually bisecting lines, preferably a horizontal line and a vertical line, are produced on the screen of an oscilloscope for each target that the radar system detects. The length of one of these lines is a determinable function of target range and the length of the other line is a determinable function of target radial velocity. The polarity of the system can be made such that the lines increase or decrease in length with decreasing range and approaching velocity. The intersection of the two lines is deflected in one direction, preferably vertically, to correspond with the elevation of the radar antenna and in another direction, preferably horizontally, to correspond with the azimuth of the radar antenna; thus, the intersection of the range and velocity lines gives the azimuth and elevation of the target.

Accordingly, an object of the present invention is the provision of an oscilloscope display circuit and method that will produce a display of the ranges, radial velocities, azimuths, and elevations of targets within radar range.

Another object is to provide an oscilloscope display circuit that replaces the search circuitry of an FM radar system and displays the ranges, radial velocities, azimuths, and elevations of targets within radar range.

A further object of the present invention is the provision of an oscilloscope display circuit that when utilized with an FM radar system will produce a display having one line the amplitude of which is a determinable function of target range and another line the amplitude of which is a determinable function of target velocity.

Still another object of the present invention is to provide an oscilloscope display circuit that in conjunction with an FM radar system will produce a display of two mutually bisecting lines for each target that is detected, the length of one of these lines being a determinable function of target range and the length of the other being a determinable function of target radial velocity, and the point of intersection of the two lines being a determinable function of target azimuth and elevation.

Figure 1B:
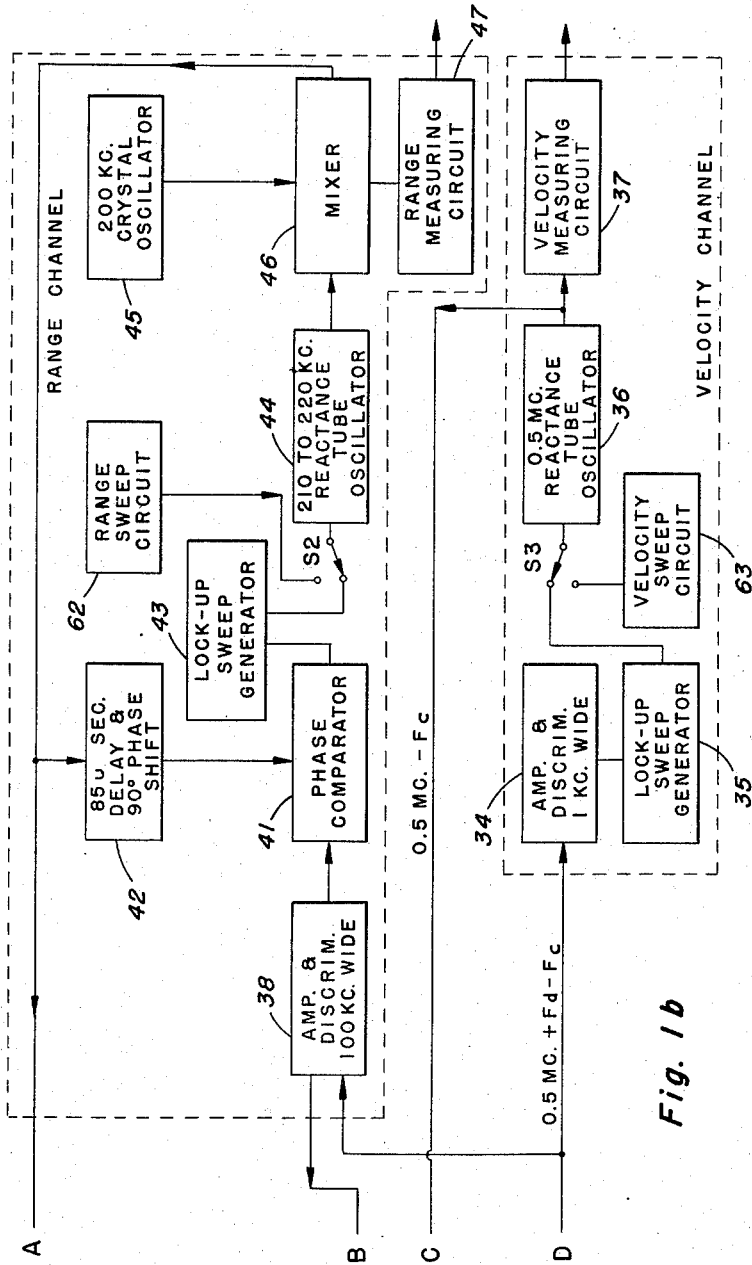
Figure 2:
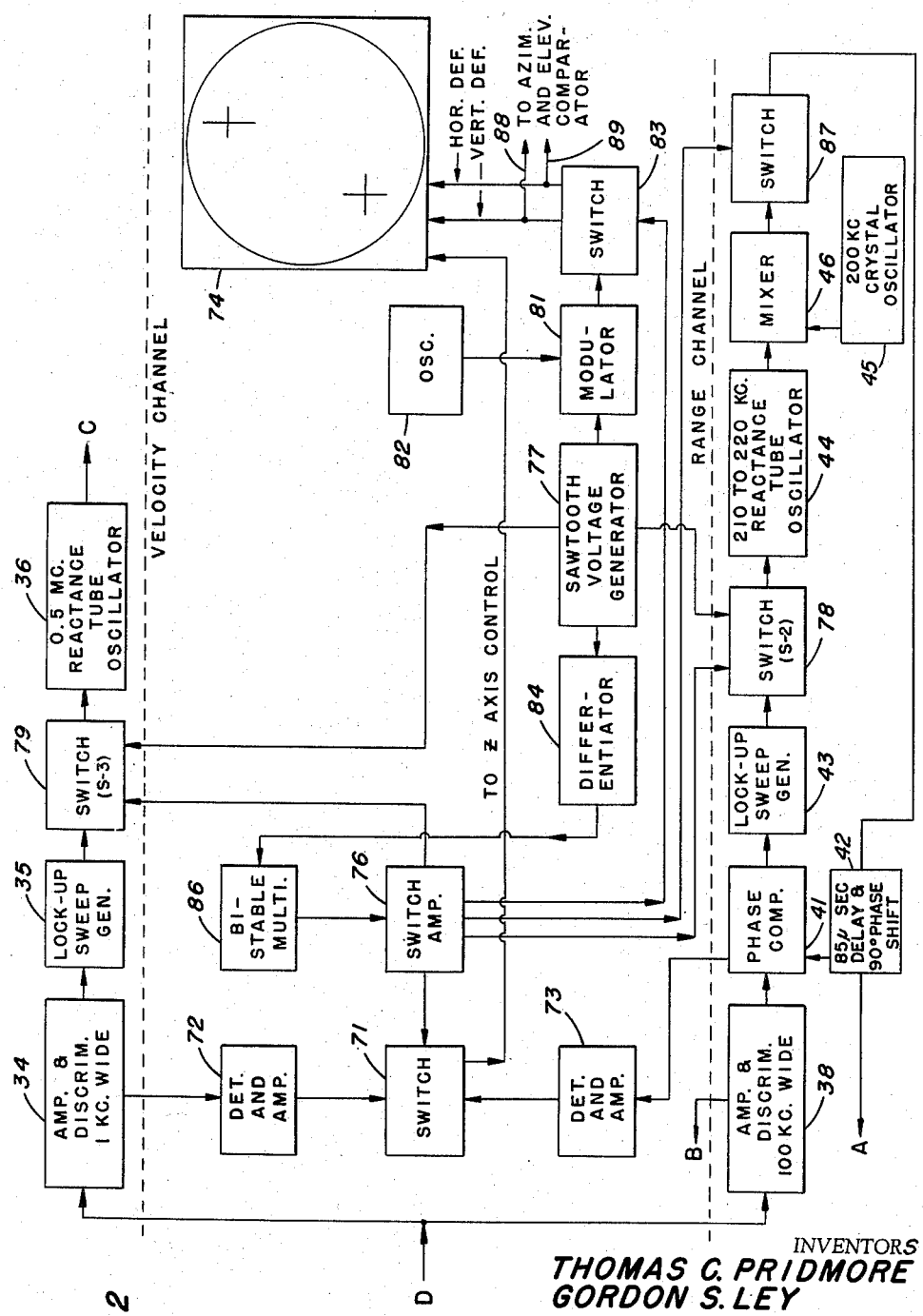

Other objects and many of the attendant advantages of this invention will be readily appreciated as the same becomes better understood by reference to the following detailed description when considered in connection with the accompanying drawings wherein:

Figs. 1(a) and 1(b) show a block diagram of a typical FM radar system with which the present invention can be utilized, and Fig. 2 illustrates a block diagram of a preferred embodiment of this invention connected with portions of the FM radar system of Figs. 1(a) and 1(b).

Referring now to the drawings, wherein like reference characters designate like or corresponding parts throughout the several views, there is shown in Figs. 1(a) and 1(b) a block diagram of a complete FM radar system. In this block diagram, switches S1, S2, and S3 are shown in the position which they would be during automatic tracking. A CW magnetron 11 operating at about 10,000 mc. is frequency modulated ±1 mc. at a rate between 10 kc. and 20 kc. by modulator 12. This signal passes to an antenna 13 by way of a directional coupler 14 and waveguide 15. The frequency modulation of the magnetron is sinusoidal, the amount of the deviation is held constant, and the modulating rate is a function of the target range.

Some of the transmitted energy propagates to the target being tracked, is reflected and is picked up by the receiving antenna 17, which is "lobed" at a 1,000 cycle rate by lobing head 18. This energy flows through a standard waveguide 21 into a balanced mixer 22 where it is converted to an I. F. frequency (54.5 mc.+Fd). Frequency Fd is the doppler frequency due to the relative motion between the radar and target. A low noise high gain "receiver amplifier" 23 amplifies the signal from the mixer 22. The gain of this amplifier is determined by an A. G. C. voltage.

An output from discriminator 49 is used to generate an A. F. C. voltage in unit 50 to maintain the local oscillator klystron 51 at a frequency of approximately 9,945.5 mc. (54.5 mc. below the center frequency of the transmitter magnetron). The local oscillator output is split in magic-T 52 and is fed to the receiver balanced mixer 22 and transmitter balanced mixer 24. The cavities 53, 54 and 55 are tuned to the local oscillator frequency and help prevent any of the transmitter energy from leaking to the receiver mixer by way of the plumbing between the crystal mixers 22 and 24.

A small portion of the transmitted signal is obtained by directional coupler 14 and is fed to a balanced mixer 24 to yield a 54.5 mc. I. F. signal. This signal is mixed with a 12.5 mc. fixed amplitude, fixed frequency signal (derived from the crystal oscillator 26) in mixer 27 to yield a 42 mc. signal. This signal is delayed by 85 microseconds in the delay line unit 28, after which it is amplified and limited in unit 29 and combined with the received signal in transmitter-receiver mixer 31. The output from this mixer is at a frequency of 12.5 mc.+Fd.

Some energy from the 12.5 mc. crystal oscillator 26 is mixed with a (0.5 mc.−Fc) signal in unit 32 to obtain a (12.0 mc.+Fc) signal. The symbol Fc denotes a correction frequency which is approximately equal to the doppler frequency at all times during tracking. The outputs of the mixers 31 and 32 are combined at doppler mixer 33 to yield a (0.5 mc.+Fd−Fc) output. This signal feeds the velocity channel, the range channel, and the position channel in parallel.

In the velocity channel, the signal first passes through an amplifier and discriminator 34 having a bandwidth about 1 kc. The output of this unit feeds the lock-up sweep generator 35 which is utilized to lock the system on a target when the radar system is not in a search condition. The output of generator 35 feeds the reactance tube oscillator 36 which operates on a frequency of 0.5 mc.−Fc. Action of the velocity servo loop is such as to keep Fc approximately equal to Fd. The output frequency from unit 36 is converted in the velocity measuring circuit 37 to a D. C. voltage of −30 to +30 volts which is proportional to relative velocities from −400 to +400 yards per second.

The signal from unit 33 also goes to the range channel where it is amplified and passed through a discriminator 38 having a bandwidth of approximately 100 kc. In this unit an A. G. C. voltage is obtained which is fed back to unit 23. The output from discriminator 38 feeds a phase comparator 41 which is also fed by 85 microsecond delay and 90 degree phase shift circuit 42 with a reference signal having a frequency in the range from 10 kc. to 20 kc. When the two inputs to this phase comparator circuit are exactly 90 degrees out of phase there is no output. However, when the phase difference is other than 90 degrees, a positive or negative D. C. output is present and is fed through lock-up sweep generator 43 to a reactance tube oscillator 44 which can vary from 210 kc. to 220 kc.; the exact frequency depending upon the range of the target to be tracked. The signal from reactance tube oscillator 44 is mixed with a fixed 200 kc. signal from an oscillator 45 in mixer 46 whose output is the difference frequency which is in the range from 10 kc. to 20 kc. This difference frequency is fed to a range measuring circuit 47 which converts the frequency to a voltage from 0–50 volts that is proportional to range of the target in the interval from 0–2,000 yards. The output frequency from unit 46 is also fed to the delay line and phase shift circuit 42, and is also employed to control the rate of deviation of the transmitter modulator 12.

Some of the energy from the doppler mixer 33 goes to the position channel where it is first amplified in unit 56, which has a bandwidth of approximately 10 kc., and is detected in unit 57. The 1000 cycle signal from detector 57 is fed to the azimuth and elevational phase comparator 58. The lobing generator 65 generates the 4 phase 1,000 cycle signal for the lobing head 18 and phase comparator 58. The output from unit 58 is fed to azimuth and elevation receiving antenna servo units 59 which mechanically drive the receiving antenna 17 in such a direction as to keep it locked on the target being tracked. A servo system 60 is used to keep the transmitting antenna 13 pointed in the same direction as the receiving antenna 17 at all times. A slight mis-alignment of the transmitting antenna 13 or some time delay in the transmitter drive servo is not serious because it simply reduces the target elimination by some small amount. The position lock of the radar is unaffected.

When the radar system is in a search condition, the electronic switches S1, S2, and S3 will all be in positions opposite to that shown on the block diagram. Position information from a manually operated sighting station or from a programmed search unit 61 will be fed to unit 58. During search, unit 62 generates a sawtooth sweep voltage which is fed by way of switch S2 to the reactance tube oscillator 44 causing it to sweep over the range of frequency from 210 kc. to 220 kc. Similarly, during a search for the target in velocity, unit 63 generates a sawtooth voltage which is fed to the reactance tube oscillator 26, by way of switch S3, to vary the frequency above and below the nominal half mc. value by an amount equal to the maximum doppler shift expected.

A preferred embodiment of the present invention is shown in Fig. 2 connected to slightly modified range and velocity channels of the FM radar system of Figs. 1(a) and 1(b), but it is to be realized that this invention can be utilized, as well, with many other types of FM radar systems. Outputs from discriminator 34 and phase comparator 41 are coupled to switch 71 by detector-amplifier circuits 72 and 73, respectively. Switch 71 connects only one of these outputs at any one time to the Z axis control of oscilloscope 74 which is preferably but not necessarily of the electrostatic type; the particular connection depending upon the state of energization of switch 71 which is controlled by switch amplifier 76. Sawtooth voltage generator 77 supplies a sawtooth voltage wave train to the range and velocity channel reactance tubes through sequentially operated switches 78 (S-2) and 79 (S-3) respectively. Generator 77 supplies a sawtooth voltage wave train to modulator 81 to control the amplitude of the signal from oscillator 82 that is applied to either the horizontal or vertical deflection system of oscilloscope 74; the energization of switch 83 determining upon which deflection system the signal is applied. A sawtooth voltage wave train from generator 77 is differentiated by differentiator 84 and conducted to bi-stable multivibrator 86, which produces a signal that actuates switch amplifier 76. The five outputs from switch amplifier 76 are individually joined to switches 71, 78, 79, 83, and 87. Leads 88 and 89 connect the output of the azimuth and elevation comparator 58 to the vertical and horizontal deflections systems, respectively, of oscilloscope 74 to synchronize the movement of the oscilloscope beam with the movement of antenna 17.

When it is desired to initiate a search operation, the embodiment shown in Fig. 2 is energized by some switch means (not shown), whereupon generator 77 commences the generation of sawtooth waves. The differentiated sawtooth output from generator 77 triggers bi-stable multivibrator 86 into one of its two stable states. In one state, multivibrator 86 energizes switch amplifier 76 which in turn activates: switch 71 to couple detector-amplifier circuit 72 to the Z axis control; switch 79 to disconnect lock-up sweep generator 35 from and to connect an output from generator 77 to reactance tube oscillator 36; switch 78 to disconnect an output of generator 77 from and to connect lock-up sweep generator 43 to reactance tube oscillator 44; switch 83 to join the vertical deflection system to modulator 81; and switch 87 to disconnect the output of mixer 46 from the input to modulator 12. This last switching operation is necessary due to the fact that when the radar system is in a searching operation, the range channel is not locked-up and magnetron 11 would otherwise undergo frequency modulation as a result of the output from mixer 46. The velocity channel bandwidth is much too narrow to function properly with the large deviations of the magnetron frequency caused by the range channel, thus the disconnection of mixer 46 is required if magnetron 11 is to operate as a CW source without frequency modulation. When a target is encountered by the radar beam during search, antenna 17 receives an echo signal which after amplification and frequency conversion in units 22, 23, and 31, is mixed in mixer 33 with the sweeping output from oscillator 36 which has been altered in frequency in mixer 32. If the target has a radial velocity with respect to the transmitter, there will be a change in frequency due to the doppler effect. The output of mixer 33 is thus a varying frequency whose median frequency is a function of the target radial velocity. This varying frequency has a range much greater than the bandwidth of discriminator 34 and hence this discriminator will not produce an output except when this varying frequency passes through the frequencies contained in the bandwidth of discriminator 34. The time of occurrence of an output pulse from discriminator 34 with respect to the initiating pulse of generator 77 is thus a function of target velocity since that velocity determines the median frequency of the output from mixer 33. The discriminator output pulse is detected and amplified in unit 72 and energizes the Z axis control to turn the oscilloscope beam on for the duration of this pulse. At the instant that generator 77 triggers bistable multivibrator 86, it transmits a sawtooth wave to modulator 81. This sawtooth wave has a much longer period than a cycle from oscillator 82 and thus the modulated wave from modulator 81 is a high frequency wave having the frequency of the input wave from oscillator 82, with a constantly increasing or decreasing envelope. Whether the envelope decreases or increases with respect to time depends upon the polarity of the slope of the sawtooth wave from generator 77. Of course this high frequency wave is not visible on the oscilloscope except at the time when the Z axis control is energized, which time is a function of the radial target velocity. The vertical heighth of a scope pattern is proportional to the voltage on the vertical deflection system; hence, when the beam is turned on the vertical pattern will appear as a line whose amplitude is a function of the target radial velocity. This line is actually a large number of closely spaced cycle lines which appear as one line due to the high frequency of the wave from modulator 81 and the slowness of movement of the scope beam in the brief interval in which the oscilloscope beam is turned on.

When the next sawtooth wave is generated in generator 77, bi-stable multivibrator 86 will trigger into its other stable state. The outputs from switch amplifier 76 then activate: switch 71 to disconnect detector-amplifier circuit 72 from and to connect detector-amplifier circuit 73 to the Z axis control; switch 78 to disconnect lock-up sweep generator 43 from and to connect an output from generator 77 to reactance tube oscillator 44; switch 79 to disconnect an output of generator 77 from and to connect the lock-up sweep generator 35 to reactance tube oscillator 36; switch 83 to decouple the vertical plate system from and to couple the horizontal plate system to the output of modulator 81; and switch 87 to join the output of mixer 46 to modulator 12. The operation for range detection is similar to that of velocity detection except that magnetron 11 is now modulated and the rate of modulation is determined by the output frequency of generator 77 to reactance tube oscillator 44. When the received echo signal, after amplification and frequency changing, is of a frequency to pass through discriminator 38 and of proper phase to produce an output from phase comparator 42, detector-amplifier circuit 73 will operate the Z axis control to turn on the oscilloscope beam. A horizontal line will then appear on the oscillopscope screen having an amplitude that is a determinable function of range. Thus, two lines will appear on the scope and if a high persistent screen is employed there will be simultaneous patterns of a horizontal and vertical line for each target. Since the position of the scope beam is controlled by the antenna position, as in most radar systems utilizing C-scope presentation, the intersection of the two lines will be an indication of the azimuth and elevation of the target. Although it is not readily apparent, the point of intersection will approximately bisect both lines. The oscilloscope beam moves quite slowly in comparison to the period of the output from generator 77, thus the beam will not have moved a detectable amount during the time between the generation of a horizontal line and a vertical line. The quiescent point about which the vertical line cycles in positive and negative directions by equal amounts, is for practical purposes the quiescent point about which the horizontal line cycles in positive and negative directions in equal amounts. Hence, this quiescent point is the point of intersection for the vertical and horizontal lines and is midway between the ends of both lines. If it is desired to have the oscilloscope pattern increase in size with respect to proximity and approaching velocity, the sawtooth wave from generator 77 that feeds modulator 81 should have a positive slope, and if the opposite condition is desired, this wave should have a negative slope. It is to be noted that either the horizontal or vertical line can represent range or velocity.

An oscilloscope display circuit has been disclosed which if utilized in an FM radar system will produce a display that is a representation of the velocity, range, azimuth, and elevation of each target within radar range. Two mutually bisecting lines, which are preferably perpendicular, are produced, the length of one of which is a determinable function of range and the length of the other of which is a determinable function of target radial velocity. The point of intersection provides an indication of the azimuth and elevation of a target.

Obviously many modifications and variations of the present invention are possible in the light of the above teachings. It is therefore to be understood that within the scope of the appended claims the invention may be practiced otherwise than as specifically described.

What is claimed is:

1. An oscilloscope display circuit for use in a frequency modulation radar system having a velocity channel and a range channel, said oscilloscope display circuit comprising: means for producing alternate velocity and range sweeping by a frequency modulation radar system, an oscilloscope having horizontal and vertical deflection systems and a Z axis control, means for producing a linearly changing signal alternately on said horizontal and vertical deflection systems in synchronism with the alternate velocity and range sweeping, and means responsive to the output of said velocity channel when the frequency modulation radar system is sweeping in velocity and to the output of said range channel when the frequency modulation radar system is sweeping in range for energizing said Z axis control to turn on the oscilloscope beam for a short interval.

2. An oscilloscope display circuit for use with a frequency modulation radar system having a velocity channel and a range channel, said oscilloscope display circuit comprising: sweep generator means for producing a sawtooth wave train, switch means for connecting sawtooth waves from said sweep generator means alternately into said velocity channel and said range channel for producing alternate velocity and range sweeps, an oscilloscope having horizontal and vertical deflection systems and a Z axis control, means for initiating a constantly changing voltage simultaneously with the beginning of each sawtooth wave of said sawtooth wave train, means for switching said constantly changing voltage alternately to said horizontal and vertical deflection systems in synchronism with the initiation of the alternate sweeps of velocity and range, and means for switching the output of said range and velocity channels alternately to said Z axis control.

3. An oscilloscope display circuit for utilization with a frequency modulation radar system having a velocity channel with a discriminator and a sweep oscillator and having a range channel with a phase comparator and a sweep oscillator, said oscilloscope display circuit comprising: sweep generator means for producing a sawtooth wave train; switch means for alternately disconnecting said sweep oscillators from said velocity and range channels, respectively, and for connecting said sawtooth wave train alternately to said sweep oscillators in synchronism with the initiation of the sawtooth waves so that alternate sawtooth waves produce velocity and range sweeps by said sweep oscillators; an oscilloscope having horizontal and vertical deflections systems and a Z axis control; means for producing a cycling wave upon the initiation of each sawtooth wave of said sawtooth wave train, said cycling wave having a linearly changing amplitude with respect to time; means for switching said cycling wave alternately to said horizontal and vertical deflection systems in synchronism with the initiation of the alternate sweeps in said velocity and range channels; and means for switching the output of said phase comparator to said Z axis control only during the range sweeps and for switching the output of said discriminator to said Z axis control only during the velocity sweeps.

4. An oscilloscope display circuit for utilization with a frequency modulation radar system having a velocity channel and a range channel and an antenna, said oscilloscope display circuit comprising: an oscilloscope, means for producing alternate sweeps of velocity and of range by said frequency modulation radar system, means triggered by the output of said range channel during a sweep of range for producing a line on said oscilloscope the length of which is a determinable function of the time difference between the initiation of the range sweep and the occurrence of an output from said range channel, and means triggered by the output of said velocity channel during a sweep of velocity for producing a line on said oscilloscope the length of which is a determinable function of the time difference between the initiation of the velocity sweep and the occurrence of an output from said velocity channel.

5. The oscilloscope display circuit of claim 4, and means responsive to the instantaneous position of said antenna for displacing one of said lines as a determinable function of elevation of said antenna and for displacing the other of said lines as a determinable function of the azimuth of said antenna.

6. An oscilloscope display circuit for utilization with a frequency modulation radar system having a velocity channel and a range channel and an antenna, said oscilloscope display circuit comprising: an oscilloscope having a horizontal deflection system and a vertical deflection system; means for producing alternate sweeps of velocity and of range by said frequency modulation radar system; means for producing a cycling wave upon the initiation of each sweep of velocity and range, said cycling wave having a linearly changing amplitude with respect to time; means for switching said cycling wave alternately to said horizontal and vertical deflections systems in synchronism with the alternate sweeps of velocity and of range; and means triggered by the output of said velocity channel during a sweep of velocity and triggered by the output of said range channel during a sweep of range for turning on the oscilloscope beam for a short interval.

7. The oscilloscope display circuit of claim 6, and means responsive to the instantaneous position of said antenna for controlling the quiescent position of the oscilloscope beam as a determinable function of the azimuth and elevation of said antenna.

8. An oscilloscope display circuit for utilization with a frequency modulation radar system having a velocity channel with a discriminator and a velocity sweep oscillator and having a range channel with a phase comparator and a range sweep oscillator, said oscilloscope display circuit comprising: an oscilloscope having a horizontal deflection system and a vertical deflection system and a Z axis control that is normally biased so that no pattern appears on the oscilloscope; sweep generator means for producing a sawtooth wave train; velocity switch means for alternately disconnecting and connecting said velocity sweep oscillator from and into said velocity channel and for coupling said sawtooth wave train to said velocity oscillator only when said velocity controllable sweep oscillator is disconnected from said velocity channel, said velocity switch means producing a switching operation upon the initiation of each sawtooth in said sawtooth wave train; range switch means for alternately disconnecting and connecting said range sweep oscillator from and into said range channel and for coupling said sawtooth wave train to said range sweep oscillator only when said range sweep oscillator is disconnected from said range channel, said range switch means producing a switching operation upon the initiation of each sawtooth in said sawtooth wave train in a manner such that said sawtooth wave train is coupled to only one sweep oscillator at any one time; switch means for connecting said Z axis control to said discriminator when there is a sweep in velocity and to said phase comparator when there is a sweep in range; switch means for disconnecting said range channel from said frequency modulation radar system only when there is a sweep in velocity; means for producing a cycling wave upon the initiation of each sweep of velocity and range, said cycling wave having a linearly changing amplitude with respect to time; and means for switching said cycling wave alternately to said horizontal and vertical deflection systems in synchronism with the alternate sweeps of velocity and range.

9. The oscilloscope display circuit of claim 8, and means responsive to the instantaneous position of said antenna and connected to said horizontal and vertical deflection systems for controlling the quiescent position of the oscilloscope beam as a determinable function of the azimuth and elevation of said antenna.

References Cited in the file of this patent
UNITED STATES PATENTS

| | | |
|---|---|---|
| 2,436,655 | Locke | Feb. 24, 1948 |
| 2,743,438 | Page | Apr. 24, 1956 |